United States Patent [19]

Entringer et al.

[11] Patent Number: 4,634,391
[45] Date of Patent: Jan. 6, 1987

[54] ENGINE COUPLER FOR STERN DRIVE

[75] Inventors: David C. Entringer, Fond du Lac; Gerald F. Neisen, Oshkosh, both of Wis.

[73] Assignee: Brunswick Corporation, Skokie, Ill.

[21] Appl. No.: 749,917

[22] Filed: Jun. 27, 1985

[51] Int. Cl.[4] .......................................... B63H 23/00
[52] U.S. Cl. ...................................... 440/75; 440/52; 440/83; 464/17; 464/98
[58] Field of Search ................... 440/112, 111, 52, 75, 440/83, 113; 464/17, 89, 81, 82, 87, 79, 98, 99; 123/197 R, 192 R

[56] References Cited

U.S. PATENT DOCUMENTS

| 2,039,378 | 5/1936 | Anderson, Jr. | 464/98 X |
| 2,107,689 | 2/1938 | Bugatti | 464/89 X |
| 3,113,625 | 12/1963 | Conover | 464/89 X |
| 3,136,281 | 6/1964 | Kiekhaefer et al. | 440/111 X |
| 3,727,431 | 4/1973 | Yokel | 464/17 |
| 3,942,466 | 3/1976 | Bunyan | 464/79 X |
| 4,191,030 | 3/1980 | Calistrat | 464/89 |
| 4,478,585 | 10/1984 | Brandt et al. | 440/52 X |

FOREIGN PATENT DOCUMENTS 606635  6/1926  France ................... 464/98

Primary Examiner—Sherman D. Basinger
Assistant Examiner—Paul E. Salmon
Attorney, Agent, or Firm—O. T. Sessions

[57] ABSTRACT

A coupling assembly (17) for coupling the crankshaft (18) of an inboard engine (11) to the input shaft (19) of an outboard propulsion unit (15) has a coupling member (21) stamped from steel. The coupling member (21) is attached to the engine flywheel (20) at three points at the vertices of the triangular coupling member base. An elastomeric annulus (23) couples the coupling member (21) to the input shaft (19).

10 Claims, 3 Drawing Figures

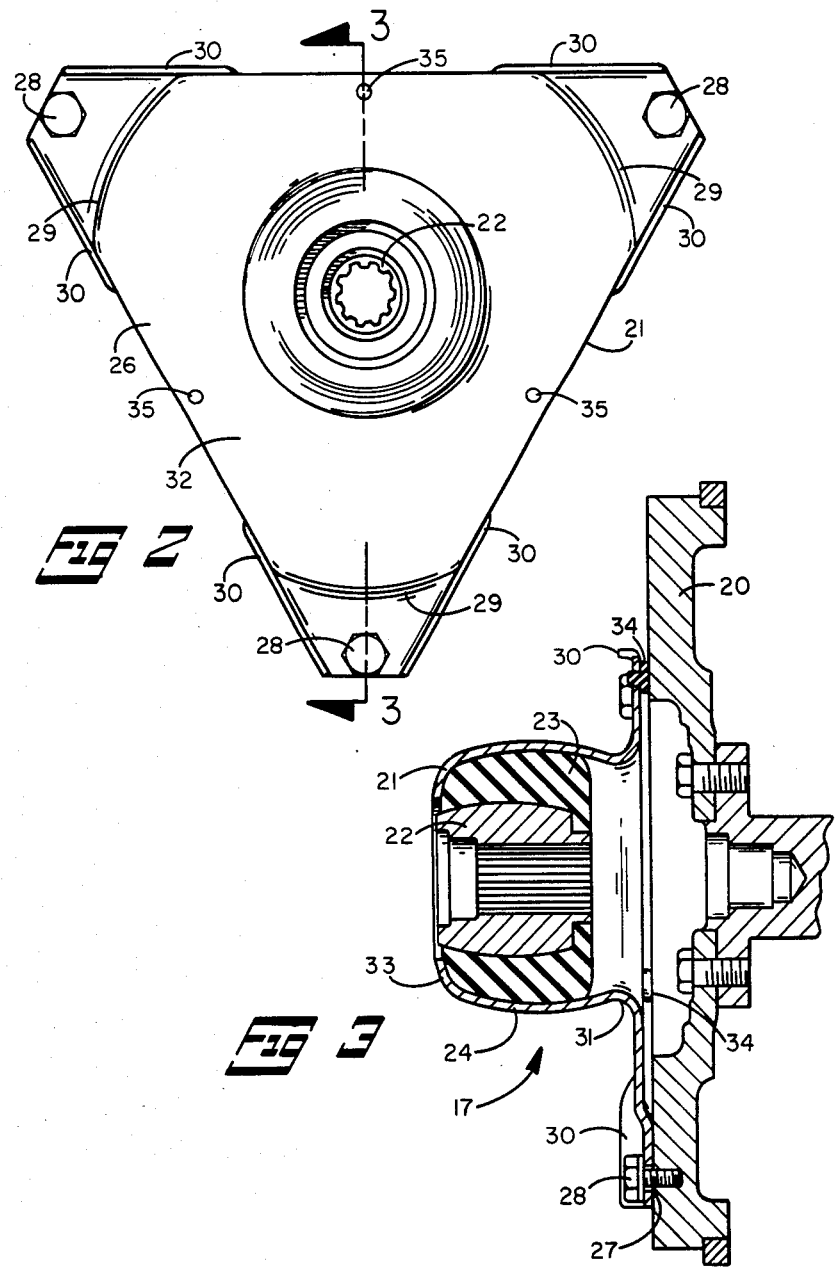

ENGINE COUPLER FOR STERN DRIVE

TECHNICAL FIELD

This invention relates to stern drives and particularly to a coupling assembly for coupling an inboard engine to an outboard drive unit.

BACKGROUND ART

It is desirable to provide a flexible coupling between the inboard engine and the outboard drive unit of a stern drive, particularly when the engine is mounted directly to the boat and the drive unit is mounted independently to the boat transom. In such installations, the natural flexibility of the boat as well as the required resilient engine mounts allow the limited degree of operational misalignment between the engine crankshaft and the input shaft of the drive unit. Prior stern drives have used resilient couplers such as that shown in U.S. Pat. No. 3,136,281 to Kiekhaefer, et al. While such couplers have been generally acceptable, under some conditions such as substantial angular misalignment under high power loadings, the rubber connections have failed.

DISCLOSURE OF INVENTION

The present invention provies a coupling assembly for coupling the drive shaft of an inboard engine to the generally coaxial driven shaft of an outboard drive unit. The coupling assembly includes a flywheel fixed to the drive shaft of the engine and a coupling member formed by stamping from steel sheet. The coupling member has a generally planar triangular base lying in a plane perpendicular to the axis of the drive shaft, with the base being attached to the flywheel at three points near the vertices of the triangular base. A cylindrical outer hub is formed in the coupling member and has its axis generally coaxial with the drive shaft and driven shaft, with the hub extending from the base in a direction away from the flywheel. The coupling assembly also includes an inner hub attached to the driven shaft and an elastomeric annulus compressed between the inner hub and the outer hub. The flexibility of the coupling member allows the coupling assembly to accommodate increased loads and greater misalignment.

The coupling assembly can have the tips of the triangular base offset toward the flywheel to provide a spaced between the flywheel and the central portion of the base and a vibration damping means, such as elastomeric elements can be mounted between the central portion of the base and the flywheel.

Ribs can be provided adjacent the vertices of the triangular base to stiffen the base and to act as an impeller to provide cooling air for the coupling. Preferably a housing will be provided surrounding the flywheel and coupling, with the housing having an inlet and outlet positioned to allow the ribs on the base to act as an impeller.

DESCRIPTION OF THE DRAWINGS

FIG. 2 is an end view of the coupling of FIG. 1.
FIG. 3 is a sectional view through the coupling.

BEST MODE FOR CARRYING OUT THE INVENTION

Figure 1:
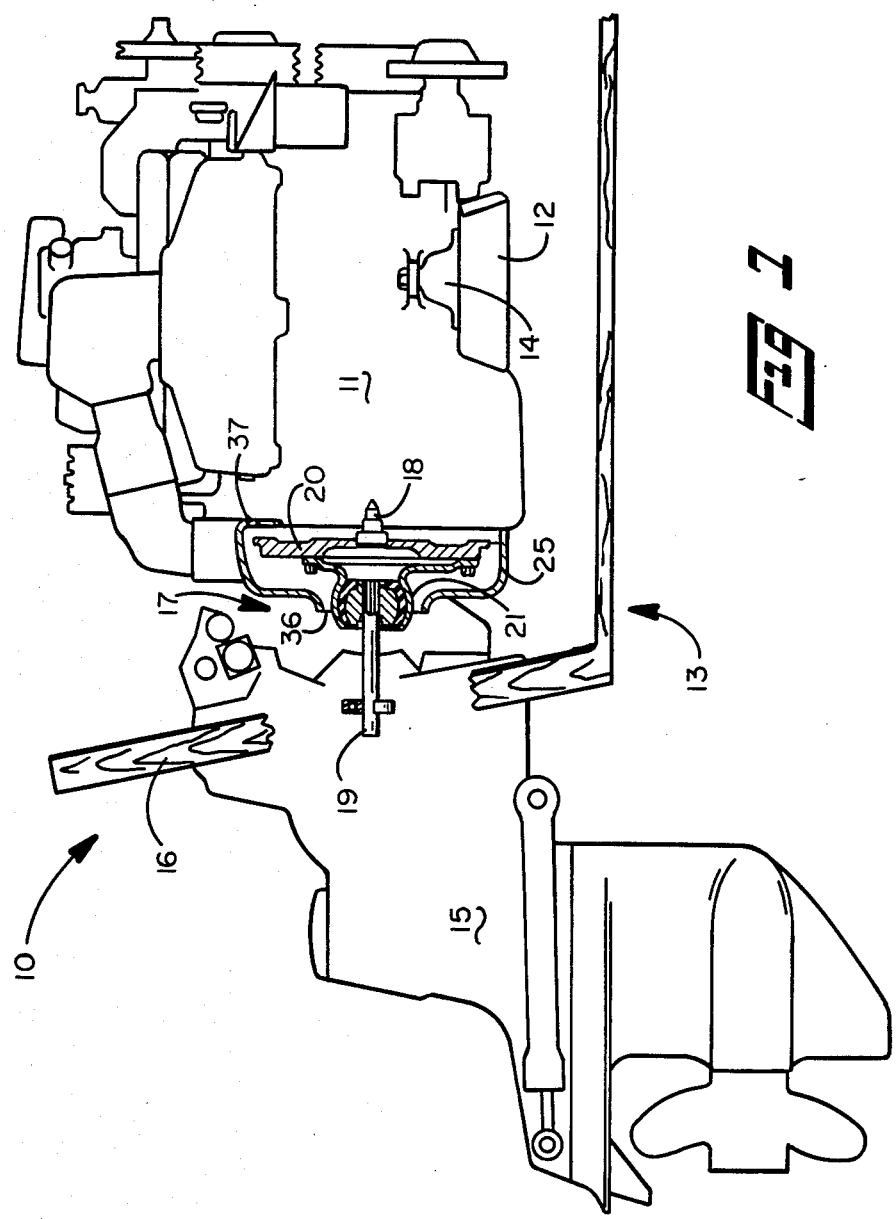
FIG. 1 is a side view of a stern drive, broken away to show the coupling of the invention.

Referring now to the drawings, a stern drive 10 incorporating the present invention is illustrated. The stern drive 10 includes a four cycle engine 11 mounted on stringers 12 forming a part of the boat hull 13. Typically, three or four resilient engine mounts, like the one engine mount 14 illustrated, will support the engine 11. An outboard propulsion unit 15 is mounted rigidly to the transom 16 of the boat 13. A coupling assembly 17 is provided to connect the crankshaft or drive shaft 18 of the engine 11 to the input or driven shaft 19 of the outboard propulsion unit 15. Because the engine 11 is mounted on resilient engine mounts 14 and the engine 11 and outboard propulsion unit 15 are mounted on separate elements of the boat hull 13, the coupling assembly 17 must accommodate the resulting misalignments and axial displacements between the engine crankshaft 18 and the input shaft 19 of the outboard unit 15.

The coupling assembly 17 include a flywheel 20 fixed to the engine crankshaft 18, a coupling member 21 attached to the crankshaft 18, an inner hub 22 attached to the driven shaft 19, and an elastomeric annulus 23 compressed between the inner hub 22 and an outer hub 24 formed on the coupling member 21. A flywheel housing 25 is attached to the engine 11 and substantially encloses the flywheel 20 and coupling assembly 17.

The coupling member 21 is formed by stamping from ten gauge SAE 1008 steel and includes a generally planar triangular base 26 and a cylindrical outer hub 24. Attachment holes 27 are provided through the base 26 near the vertices of the triangle to allow attachment with bolts 28 to the engine flywheel 20. The regions surrounding the attachment holes 27 are stiffened by offsets 29 formed across the vertices of the triangular base 26 by displacing the vertices of the base 26 toward the flywheel 20 and by providing ribs 30 on the edge of the coupling member 21 near the vertices. The ribs 30 are turned up on the edge of the coupling member 21 away from the flywheel 20 and extend from the tips of the triangular base 26 past the offsets 29 and partially along the edge of the central porton of the base 26. The cylindrical outer hub 24 is formed at the center of the coupling member 21 and includes a necked-in portion 31 adjacent the planar center portion 32 of the base 26. The outer hub 24 is generally barrel shaped and has smooth contours along its periphery with a flange 33 at its outer end away from the flywheel 20.

The coupling member 21 is attached to the flywheel 20 by three bolts 28 through the attachment holes 27 near the vertices of the triangular base 26. The central planar portion of the base 26 acts as a flex plate to accommodate the angular loads placed on the coupling member 21 by the misalignments of the drive and driven shaft 18 and 19. To damp resonant loading of the coupling member 21 which may occur at various engine speeds, elastomeric damping means is mounted between the central portion of the base 26 and the flywheel 20. The damping means consists of three elastomeric cylinders 34 having a reduced diameter pin extending through holes 35 provided at the mid points of the sides of the triangular coupling member 21 and compressed between the coupling member 21 and the engine flywheel 20. These elastomeric elements 34 serve to damp the natural frequency of the coupling member 21.

The coupling member 21 is connected to the driven shaft by the internally splined inner hub 22 which engages the externally splined driven shaft 19. The elastomeric annulus 23 is bonded to the inner hub 22. The elastomeric annulus 23 has an outer diameter greater than the inner diameter of the outer hub 24 of the coupling member 21. The inner hub 22 and elastomeric annulus 23 are pressed into the outer hub 24 of the coupling member 21, through the necked-in porton 31, to form a coupling capable of carrying substantial torsional loads while absorbing torsional shock.

Because the outboard drive unit 15 and engine 11 are not rigidly connected, the coupling assembly 17 must absorb the misalignments and displacements caused by engine torque reaction and the flexing of the boat hull 13 in response to engine torque and wave action. In the present device the misalignments and displacements are absorbed by combination of the flexibility of the base portion 32 of the coupling member 21 and the elastomeric annulus 23.

The normal operation of the flexible coupling assembly 17 causes heat build up in the elastomeric annulus 23. To improve the load carrying capability of the elastomeric annulus 23, cooling air is provided over the annulus 23. The flywheel housing 25 surrounds the flywheel 20 and coupling assembly 17 and forms an annular opening 36 around the outer hub 24 of the coupling member 21. An outlet 37 is provided at the radially outward periphery of the flywheel housing 25. The flanges 30 on the coupling member 21 serve as impeller blades to draw air in the annular opening 36 around the outer hub 24 and expel it through the outlet 37 opening. Thus cooling air is drawn over the hub area to cool the elastomeric annulus 23.

We claim:

1. In a marine drive having an inboard engine coupled to drive an outboard drive unit, a coupling assembly for coupling the drive shaft of said engine to a generally coaxial driven shaft of said drive unit, said coupling assembly comprising:
   (A) a flywheel fixed to said drive shaft;
   (B) a coupling member formed by stamping from a single steel sheet, said coupling member having
      (1) a generally planar triangular base lying in a plane perpendicular to the axis of said drive shaft, said base including a central planar portion spaced from said flywheel to act as the flex plate to accommodate loads resulting from misalignments of said drive and driven shafts and three attachment regions respectively near the vertices of said triangular base, each of said attachment regions attached to said flywheel, and
      (2) a cylindrical outer hub having its axis generally coaxial with said drive shaft and said driven shaft, said hub extending from said base away from said flywheel;
   (C) an inner hub attached to said driven shaft; and
   (D) an elastomeric annulus compressed between said inner hub and said outer hub.

2. The coupling assembly defined in claim 1 wherein said attachment regions of said triangular base are offset from said central portion toward said flywheel to provide a space between said flywheel and the central portion of said base.

3. The coupling assembly defined in claim 2 wherein said base includes ribs adjacent the vertices of said triangular base to stiffen said base adjacent said attachment regions.

4. The coupling assembly defined in claim 3 wherein said ribs are formed on the edges of said base.

5. The coupling assembly defined in claim 3 wherein said engine includes a housing surrounding said flywheel and coupling, said housing having an inlet and an outlet positioned radially outward from said inlet, whereby said ribs act as an impeller to provide a flow of cooling air from said inlet to said outlet.

6. The coupling assembly defined in claim 1 further comprising a vibration damping means mounted between said central portion of said base and said flywheel.

7. The coupling assembly defined in claim 6 wherein said vibration damping means includes an elastomeric element compressed between said base and said flywheel.

8. The coupling assembly defined in claim 6 wherein said vibration damping means includes three elastomeric elements respectively located near the midpoints of the edges of said triangular base and between said base and said flywheel.

9. The coupling assembly defined in claim 1 wherein said cylindrical outer hub includes a reduced diameter neck portion adjacent said base.

10. The coupling assembly defined in claim 9 wherein said outer hub includes an internal flange at its end remote from said base.

* * * * *